Figures 1, 2, 3:
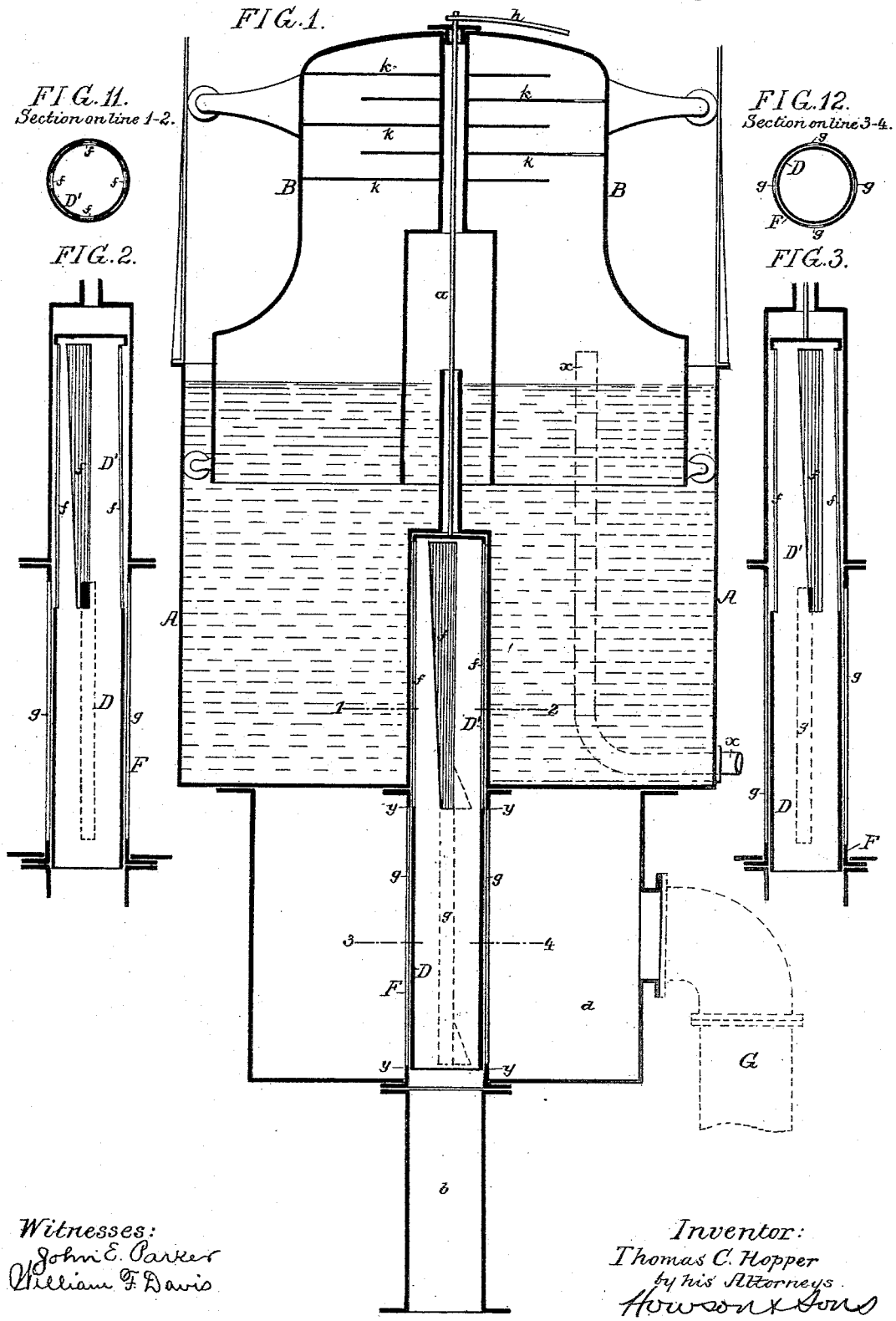

(No Model.) 4 Sheets—Sheet 1.
T. C. HOPPER.
GAS PRESSURE GOVERNOR.

No. 339,415. Patented Apr. 6, 1886.

FIG. 11. Section on line 1-2.

FIG. 12. Section on line 3-4.

Witnesses:
John E. Parker
William F. Davis

Inventor:
Thomas C. Hopper
by his Attorneys
Howson & Sons (No Model.) 4 Sheets—Sheet 2.
T. C. HOPPER.
GAS PRESSURE GOVERNOR.
No. 339,415. Patented Apr. 6, 1886.
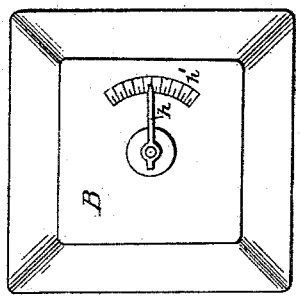
FIG.20.
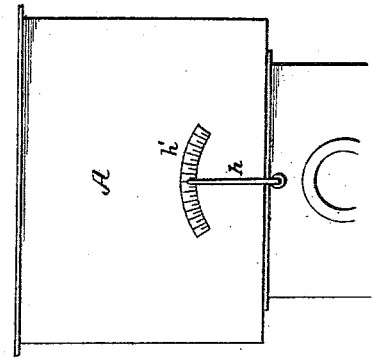
FIG.21.
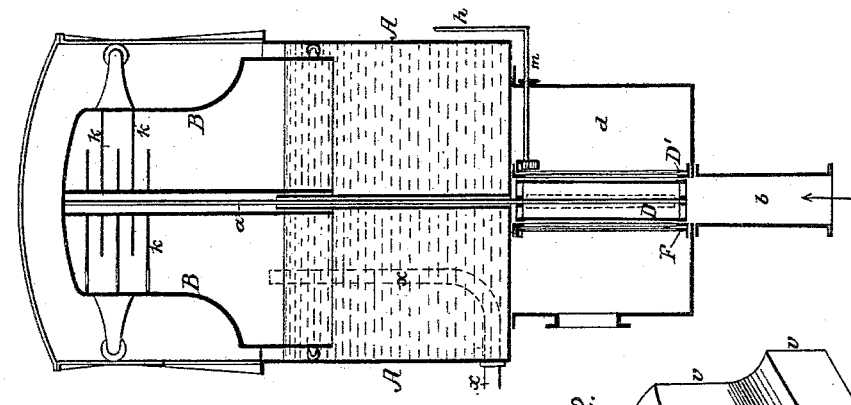
FIG.6.
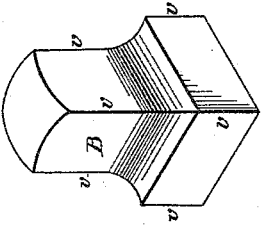
FIG.22.
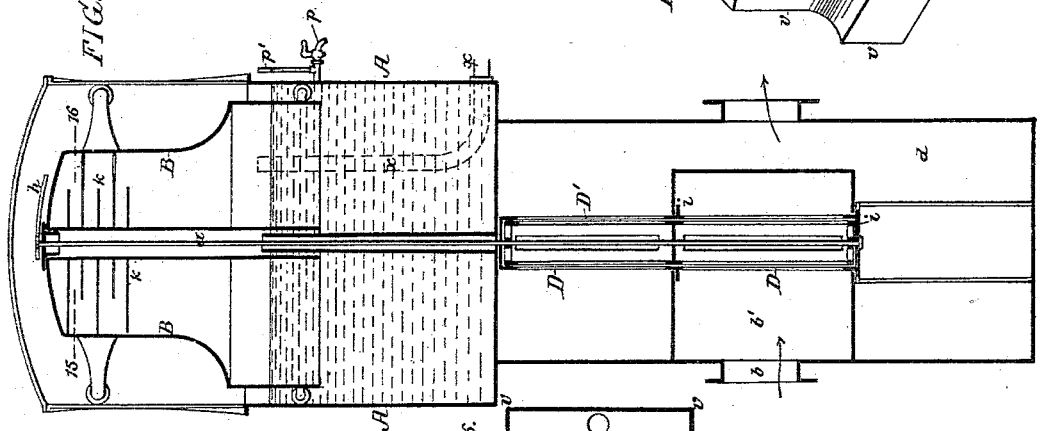
FIG.4.
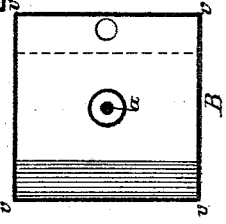
FIG.19. Section on line 15-16.
Witnesses:
John E. Parker
William F Davis
Inventor:
Thomas C. Hopper
by his Attorneys:
Howson & Sons (No Model.) 4 Sheets—Sheet 3.
T. C. HOPPER.
GAS PRESSURE GOVERNOR.
No. 339,415. Patented Apr. 6, 1886.
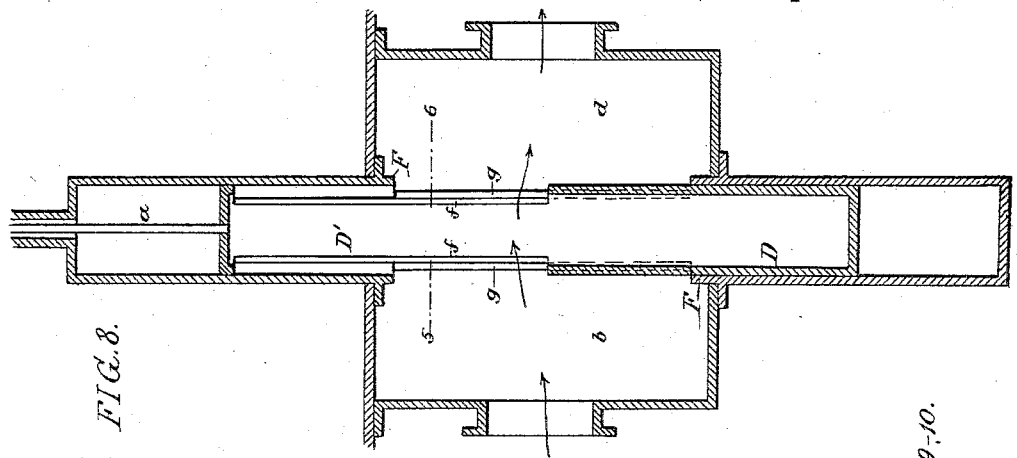
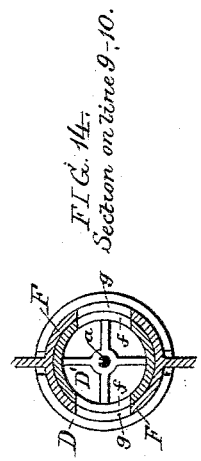
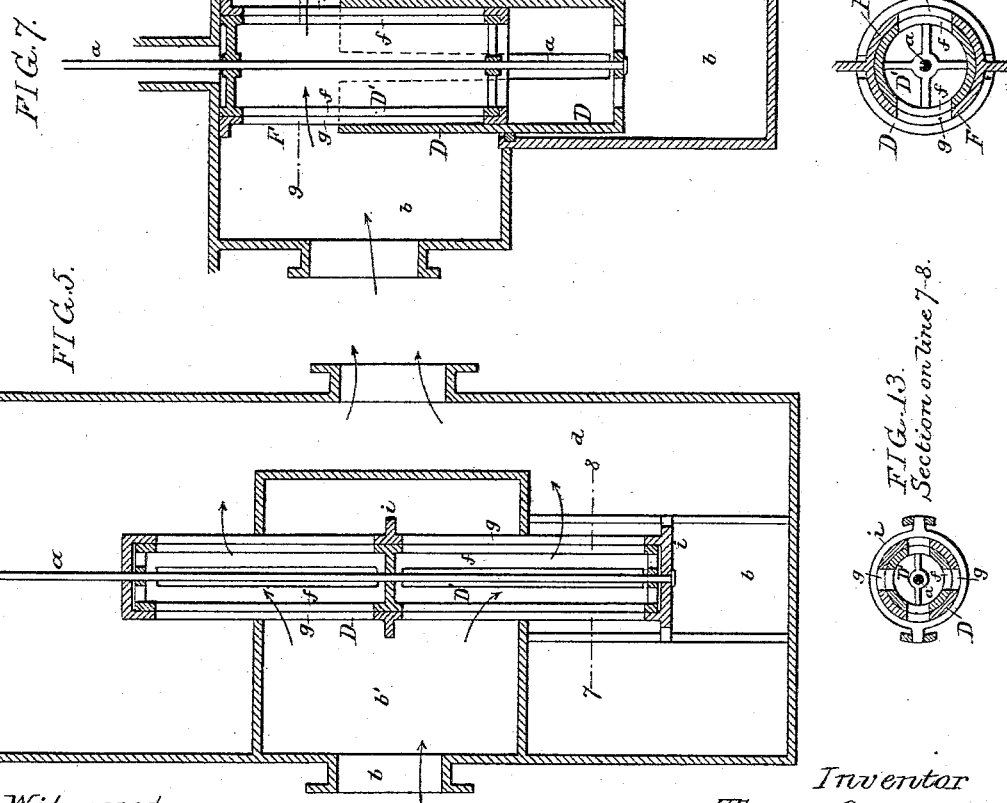
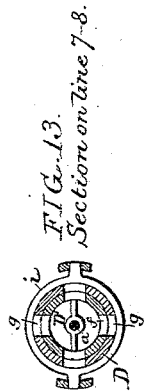
Witnesses:
John E. Parker
William F Davis
Inventor
Thomas C. Hopper
by his Attorneys
Howson & Sons
N. PETERS, Photo-Lithographer, Washington, D. C.

(No Model.) 4 Sheets—Sheet 4.
T. C. HOPPER.
GAS PRESSURE GOVERNOR.
No. 339,415. Patented Apr. 6, 1886.
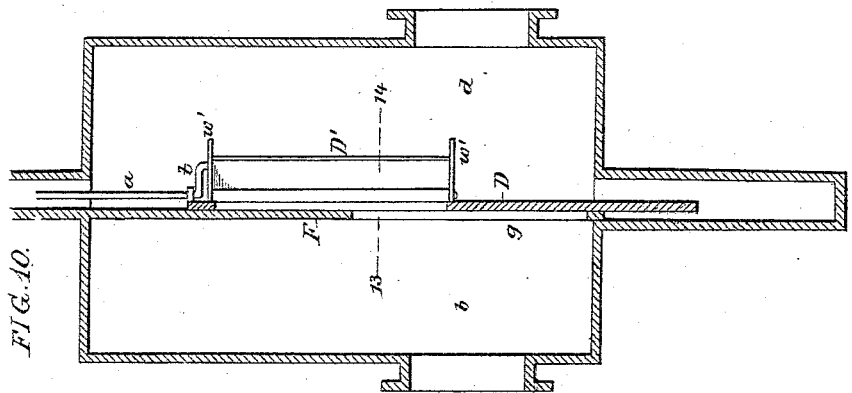
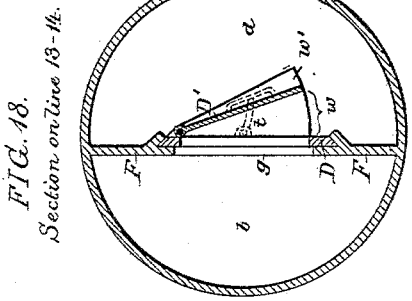
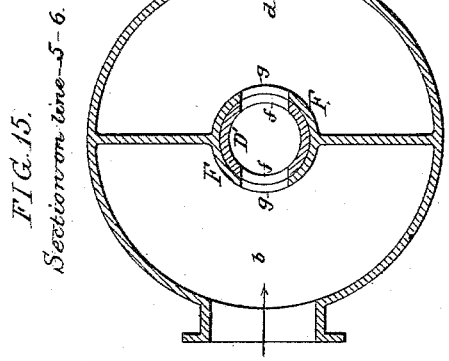
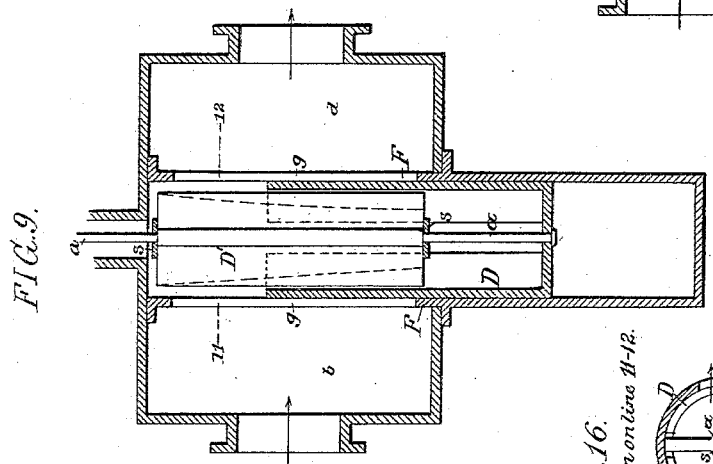
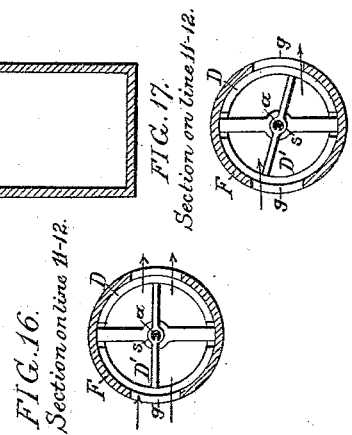
Witnesses:
William F. Davis.
John E. Parker.
Inventor:
Thomas C. Hopper
by his Attorneys
Howson & Sons

UNITED STATES PATENT OFFICE.

THOMAS C. HOPPER, OF PHILADELPHIA, PENNSYLVANIA.

GAS-PRESSURE GOVERNOR.

SPECIFICATION forming part of Letters Patent No. 339,415, dated April 6, 1886.

Application filed December 14, 1885. Serial No. 185,633. (No model.)

*To all whom it may concern:*

Be it known that I, THOMAS C. HOPPER, a citizen of the United States, residing in Philadelphia, Pennsylvania, have invented certain Improvements in Gas-Pressure Governors, of which the following is a specification.

My invention relates to certain improvements in that class of gas-governors in which the valve controlling the flow of gas from the holder to the main or distributing pipe is connected to a float, the position of the valve and the area of the opening between the holder and the main being determined by the rise and fall of said float, which is subjected to the pressure of the gas in the main.

One object of my invention is to provide for a regulation of the area of the opening between the holder and main independent of that due to the movement of the valve under the influence of the float, further objects being to simplify the construction of the float when made with different internal areas, and to prevent the trembling or shaking of the float in the operation of the governor. These objects I attain in the manner which I will now proceed to describe, reference being had to the accompanying drawings, in which—

Figure 1 is a vertical section of a gas-governor constructed in accordance with my invention; Figs. 2 and 3, views of a valve and port regulator forming part of said governor, the regulator being in different positions from that shown in Fig. 1; Figs. 4 to 10, inclusive, sectional views illustrating modified forms of valves for use in connection with the governor; Figs. 11 to 19, inclusive, sectional plans on the lines indicated; Fig. 20, a plan view of the bell-float shown in Fig. 4; Fig. 21, a side view of part of the governor shown in Fig. 6; and Fig. 22, a perspective view, on a reduced scale, of the bell-float shown in the various figures.

In Fig. 1, A represents a water-vessel in which is guided an inverted bell-float, B, which, in the present instance, has its upper portion contracted in area in respect to the lower portion, so as to increase the normal pressure upon the gas in the distributing-main as the float descends, as set forth in my Letters Patent No. 328,681, dated October 20, 1885. The gas enters the float through a pipe, $x$, (shown by dotted lines,) which pipe communicates with the distributing pipe or main, preferably at some distance from the governor.

Suspended from the float B by a rod, $a$, is a valve, D, which, in connection with a ported chest, F, serves to regulate the flow of gas from the inlet-pipe $b$ to the discharge-chamber $d$, with which communicates the distributing pipe or main G. (Shown by dotted lines in Fig. 1.) The valve D consists of a simple cylinder open at both ends, and comprises that portion between the lines $y\ y$. The buoying action of the gas upon the bell is such that the ports of the chest F are uncovered by the valve just sufficient to permit a flow of gas into the main necessary to maintain a desired normal pressure therein, an increase in demand causing the lowering of pressure beneath the bell, and a descent of the same sufficient to cause such additional opening of the ports of the valve-chest as will permit a freer flow of gas necessary to supply the increased demand, and a decreased demand causing back-pressure in the main and increasing the pressure beneath the bell, so as to cause a rising of the same and the valve, and a cutting off of the area of the ports of the chest F proportionate to this decreased demand. Where the upper portion of the bell is decreased in area, there is an increase in the normal pressure maintained in the distributing pipe or main as the bell falls, owing to the decreased area of gas upon which the weight of the bell is exerted, this increase of normal pressure on the descent of the bell being effected also in that class of governors in which weights are applied to the bell as it descends and removed as it ascends.

In apparatus of this class it is advisable to provide means for governing the flow of gas into the main independently of the automatic regulation due to the movement of the valve under the influence of the rise and fall of the bell-float. For instance, the demand for gas during the summer months is not as heavy as during the winter months, so that in order to supply the heaviest demand during each summer period the valve would not have a range of movement which would cause the bell to drop to such an extent as to exert the heaviest pressure upon the gas; hence there could not be maintained in the main a pressure as high as when the full movement of the valve and bell was necessary in order to maintain the supply. For this reason I combine with the valve or valve-casing an adjustable port-regulator or damper, by means of which the area of the ports may be increased or diminished to accord with the general variations in demand upon the main, the movement of the valve under control of the bell-float being relied upon to compensate for frequent and temporary variations in demand. This adjustable port-regulator, as shown in Fig. 1, is in the form of a continuation, D', of the valve D, the suspending-rod $a$ being connected to the upper end of the same. In this continuation are formed ports $f$, which coincide with the ports $g$ of the chest F, these ports $f$ being straight on one side and inclined on the opposite side, as shown. The port-regulator can be adjusted circumferentially by turning the suspending-rod $a$, so as to throw the ports $f$ more or less out of line with the ports $g$, a pointer, $h$, on the upper end of the rod $a$, in connection with a dial, $h'$, on the upper end of the bell B, serving to indicate the extent to which the ports are open. When the port-regulator is in the position shown in Fig. 1, the ports $g$ have a full acting area, and the action of the governor is the same as if a plain cylindrical valve were used, as in my former patent; but by turning the port-regulator to the position shown in Fig. 2 the area of the ports $g$ is reduced one-half, so that the same range of movement of the bell and valve is required as would be required by twice the demand upon the main if the ports were fully open, as in Fig. 1. By causing the straight sides of the ports $f$ to act as port-closers, as in Fig. 2, the area of the ports $g$ is uniform throughout; but if the port-regulator D' is turned in the opposite direction, so as to bring the inclined sides of the ports $f$ into action, the ports $g$ will be of differential area, as shown in Fig. 3. The same effect can be produced by making the ports of the valve-casing straight on one side and inclined on the other, the ports of the regulator being straight on both sides; or the ports of both the valve-casing and regulator may be straight on one side and inclined on the other. The ports $f$ and $g$ are preferably increased in size at the lower ends, as shown by dotted lines, so that when the valve is nearing the limit of its opening movement, and the heaviest pressure is on the gas, less movement of the valve is demanded for a certain increase in port area than during the beginning of the movement, so that the length of the valve and chest can be reduced.

My invention is susceptible of various modifications, both in the construction of the valve and in the construction and operation of the port-regulator. For instance, in Figs. 4, 5, and 13 I have shown a ported valve working through openings in the casing of a chamber, $b'$, communicating with the inlet $b$, this valve having flanges $i$, which close the openings when the valve is fully elevated, the gas escaping through such an area of port as is beyond the seats when the valve is open. In this case the port-regulator is in the form of a sleeve, contained within the valve, and secured to the suspending-rod $a$, which is swiveled to the valve, so that it can be turned in order to adjust the regulator without turning the valve, the latter being retained by lugs upon the lower flange, $i$, engaging with slotted guides in the discharge-chamber $d$ of the apparatus. (See Fig. 13.) In Fig. 6, on the other hand, I have shown a port-regulator in the form of a sleeve surrounding the ported valve-casing F, the valve working within said casing, and being in the form of cylinder open at both ends, as in my patent above referred to. In this case the sleeve forming the regulator has an annular rack, with which engages a pinion on a shaft, $m$, projecting from the casing of the discharge-chamber, and having a pointer, $h$, projecting over a dial, $h'$, on the side of the casing A, as shown in Fig. 21.

In Figs. 7 and 14 I have shown a valve structure in which the valve D is outside of the ported valve-casing F, the port-regulator D' being inside of the same, and having keys or feathers adapted to a longitudinal groove in the suspending-rod $a$, so that while the port-regulator has no vertical movement with the valve or suspending-rod, it must partake of any rotary movement imparted to the latter.

Figs. 8 and 15 show a valve and regulating devices substantially similar to those shown in Fig. 1, with the exception that the gas enters at one side of the casing and escapes at the other side, instead of entering at the bottom and passing up through the hollow valve.

In all of the port-regulators before described a ported sleeve or shield has been adopted; but this form is not essential to the proper carrying out of my invention, as a pivoted plate in the nature of a damper is equally available for the purpose of regulating the port area independently of the movement of the valve. In Figs. 9, 16, and 17 I have shown one way of using such a damper. In this case the valve moves vertically within the ported valve-chest, so as to open or close the ports of the latter in the manner before described. The regulator D' is confined between upper and lower fixed bearings, $s$, in the valve-chest, the valve being slotted for the reception of the supporting-arms of said lower bearing, as shown. When the damper is in line with the opposite ports $g$, as in Fig. 16, it offers no obstacle to the free flow of gas through the chest in the direction of the arrows, but by turning the damper in one direction or the other the freedom of flow may be restricted to any desired extent. (See Fig. 17, for instance.) A groove and feather connection between the regulator and rod $a$ is adopted, as in Figs. 7 and 14, so that the said regulator turns with the rod, but does not partake of its vertical movement.

In Figs. 10 and 13 I have shown a flat valve, D, guided on the back of a partition-plate, F, which divides the inlet and discharge chambers $b$ and $d$ and has a port, $g$. The valve is provided with a pivoted damper, D', which can be adjusted by means of an arm, $t$, on the rod $a$. In this case the effective width of the port for the passage of gas is the distance between the back of the valve and the edge of the damper, as indicated by the bracket $w$ in Fig. 18, this distance being varied as desired by the adjustment of said damper.

To prevent the escape of gas at the top or bottom of the damper, the valve D may have plates $w'$, as shown. By inclining or curving the edge or edges of the damper-plate as shown by dotted lines in Fig. 9, for instance, the same effect may be produced as by the use of tapering ports, as in Figs. 1, 2. and 3.

When the bell B is contracted in area, as shown, it is difficult to manufacture, if the ordinary circular form is adhered to; hence I prefer to make the bell of triangular, square, or other polygonal form, as shown in Figs. 19, 20, and 22, so that the top and sides of the bell may be made of blanks properly shaped and seamed together at the corners or edges $v$, the bell being provided with one contraction, as shown, or with more than one, as may be desired.

In order to prevent the trembling or shaking movement of the float B, which might otherwise be caused by pulsations in the distributing pipe or holder, I provide the upper portion of said float with a number of internal plates or diaphragms, $k$, extending partly across the float and projecting alternately from opposite sides of the latter, these plates serving to retard the vertical movement of the float, and thus render it free from the influence of sudden and temporary changes of pressure in the holder or main. When the upper portion of the float is contracted in diameter, as shown, it becomes advisable to govern the level of liquid in the vessel A, so as to provide any desired range of movement of the float before contracting the area of gas upon which the weight of the float is exerted; hence I provide the vessel A with a draw-off cock, $p$, and gage $p'$, whereby the level of liquid can be lowered to any desired extent, the height of liquid remaining in the vessel being indicated by the gage.

I claim as my invention—

1. In apparatus for automatically regulating the flow of gas, the combination of a valve and valve-chest having ports, as described, whereby the area for the passage of gas is governed by the movement of the valve, with an adjustable regulator, whereby the area of said governing-ports may be increased or diminished independently of the regulation due to the movement of the valve.

2. In apparatus for automatically regulating the flow of gas, the combination of a ported valve or valve-chest, an adjustable port-regulator, whereby the flow of gas can be governed independently of the regulation of gas due to the movement of the valve, a float connected to the valve, and means, substantially as described, whereby the normal pressure upon the gas is varied as the float changes its position, all substantially as specified.

3. In apparatus for automatically regulating the flow of gas, the combination of a ported valve or valve-chest, an adjustable port-regulator, whereby the flow of gas can be governed independently of the regulation due to the movement of the valve, and a float connected to the valve and constructed as described, whereby it presents different internal areas, all substantially as specified.

4. In apparatus for automatically regulating the flow of gas, the combination of the ported valve or valve-chest, an adjustable port-regulator, whereby the flow of gas can be governed independently of the regulation due to the movement of the valve, and an operating-rod, pointer, and dial, whereby the proper adjustment of the port-regulator is determined, all substantially as specified.

5. In apparatus for automatically regulating the flow of gas, the combination of the ported valve or valve-chest, the float for operating the valve, an adjustable port-regulator, whereby the flow of gas is governed independently of the regulation due to the movement of the valve, and a valve-suspending rod carrying said port-regulator, and provided with a pointer for use in connection with a dial on the top of the float, all substantially as specified.

6. In apparatus for automatically regulating the flow of gas, the combination of a valve and valve-chest having ports, as described, whereby the area of the gas-passage is governed by the movement of the valve, with a regulator carried by the valve, but movable to increase or diminish the area of said governing-ports independently of the regulation due to the movement of the valve, all substantially as set forth.

7. In apparatus for automatically regulating the flow of gas, the combination of the ported cylindrical valve or valve-chest with a port-regulator in the form of a ported sleeve fitted to said valve or chest, all substantially as specified.

8. In apparatus for automatically regulating the flow of gas, the combination of a valve and valve-chest having ports, as described, whereby the area of the gas-passage is governed by the movement of the valve, with a regulator movable to increase or diminish the area of said governing-ports, and adjustable in a plane at right angles to that in which the valve moves in governing the flow of gas, all substantially as set forth.

9. In apparatus for automatically regulating the flow of gas, the combination of the ported valve or valve-chest with an adjustable regulator, whereby the area of the ports of said valve or chest can be governed independently of the regulation due to the movement of the valve, said regulator or the ports of the valve or chest having an inclined side or sides, all substantially as specified.

10. In apparatus for automatically regulating the flow of gas, the combination of the ported valve or valve-chest with an adjustable port-regulator, the ports of which or of the valve or chest have one side vertical and one side inclined, all substantially as specified.

11. In apparatus for automatically regulating the flow of gas, the combination of a valve controlled by a float and a valve-chest having ports abruptly enlarged in area at and near one end, all substantially as specified.

12. The within-described bell-float, polygonal in cross-sectional plan, and composed of stepped side plates secured together at the corners, all substantially as specified.

13. The combination of the bell-float with retarding plates or diaphragms within the same, as set forth.

14. The combination, in a gas-pressure governor, of the valve for controlling the flow of gas, and bell-float operating said valve and having differential internal areas, and the liquid-vessel having a drain cock and gage, all substantially as specified.

In testimony whereof I have signed my name to this specification in the presence of two subscribing witnesses.

THOMAS C. HOPPER.

Witnesses:
WILLIAM F. DAVIS,
HARRY SMITH.